Patented Nov. 10, 1942

2,301,735

UNITED STATES PATENT OFFICE 2,301,735

PROCESS OF CONVERTING HEAVY HYDROCARBON OILS

Ralph M. Melaven, Highland, Ind., and Rodney V. Shankland, Chicago, Ill., assignors to Standard Oil Company, Chicago, Ill., a corporation of Indiana No Drawing. Application December 30, 1938, Serial No. 248,625

3 Claims. (Cl. 196—52)

This invention relates to the using of a cracking catalyst for the conversion of hydrocarbon oils and particularly to the conversion of heavy hydrocarbon oils such as gas oils, petroleum residuums, hydrocarbon waxes, etc. into lower boiling hydrocarbons, particularly gasoline. The invention relates more particularly to using catalysts for the conversion of heavy hydrocarbon oils at high temperatures. One of the objects of the invention is to use a catalyst which will convert a larger amount of the oil into gasoline before it becomes necessary to regenerate it. Another object of the invention is to use a catalyst which may be repeatedly regenerated by treatment with an oxygen containing gas for removal of carbonaceous matter without significant loss of catalyst activity. Still another object of the invention is to use a catalyst of great physical strength which may be employed in granular form without serious disintegration. Other objects will become apparent from the following description.

The catalyst which we employ is prepared in the following manner: A silica gel, so-called, is prepared by adding a solution of soluble silicate, for example, sodium silicate, to an excess of strong mineral acid, such as hydrochloric acid or sulfuric acid. We prefer to use sodium silicate solution containing about 15% to 20% of $Na_2(SiO_3)_x$. In this formula $x$ is unity or greater. The acid employed in making the gel may suitably be about 15% to 25% $H_2SO_4$ and an excess of 10% to 50% may suitably be employed. Other strong acids may be used, such as HCl, $HNO_3$, etc. We have sometimes reversed this procedure, however, and added the acid to the silicate solution which causes immediate precipitation. This method gives a very active catalyst but one of low mechanical strength.

After adding the silicate solution to the acid, and mixing, it is allowed to stand and soon the solution solidifies to a jelly. This is broken up by agitation and washed in running water until substantially all the acid and soluble salts are removed. Considerable time is required to permit all the salts to diffuse from the pieces of jelly and the washing operation is facilitated by employing hot water or by digestion and boiling. The gel is then separated from the water and dried. It now resembles an irregular sand and at this stage it is crushed and screened to remove particles which are too fine for ultimate use. The gel so prepared is characterized by possessing a submicroscopic pore structure which provides an enormous amount of "pore surface" accessible only to those materials which can freely penetrate the pores and gain access to the interior of the grains. If desired, the gel may be washed only partially at first, then partly dried and finally washed until the water gives no further test for acid ion. Also, the gel may be further washed with distilled water after final drying.

The next step in the preparation of the catalyst is to subject the gel to the action of a soluble salt of cadmium under conditions such that a layer of insoluble cadmium compound is deposited on the interior pore surface of the gel. Heretofore, attempts have been made to deposit metal compounds on silica gel but these attempts have usually not succeeded in accomplishing more than depositing the metal compound on the external surface of the silica gel grains. Because of the extremely small dimensions of the pores, these are apparently plugged by precipitates and great case must be exercised to prevent the formation of a heavy precipitate. This we avoid by maintaining the gel in a slightly acid condition and the presence of basic precipitating reagents is scrupulously avoided.

According to our process, we immerse the gel in a solution of a cadmium salt, for example, a 0.1 molar solution of cadmium nitrate. In one operation 850 grams of gel was added to 10 liters of a solution of 0.153 molar cadmium nitrate. The solution was heated for two hours and then the gel was separated and washed several times by decantation with distilled water. It is preferred, however, to dry the gel after treatment with the cadmium salt before washing, the drying serving to "fix" the cadmium in the catalyst. After washing, the gel is dried and preferably heated to a high temperature in the cracking range, for example, 900° F. in a current of air or other gas when it is ready for use. The catalyst prepared in this manner may contain about 1% of cadmium.

When activating the gel with cadmium salt, we prefer to maintain the solution slightly acid corresponding to a hydrogen ion concentration of about 2–4 pH. The hydrogen ion concentration will usually increase during the activation treatment, for example, the pH may be 2.5 at the start and 1 to 1.5 at the end of the treatment.

We prefer to employ this catalyst for the cracking of hydrocarbon oils at temperatures of about 700 to 1050° F., employing contact times of between about ½ second to 5 minutes, preferably contact times within the range of 1 second to 1 minute. Contact time referred to is the time required for one volume of oil vapor at the condition of experiment to pass one volume of catalyst. We prefer to employ the catalyst at relatively low pressures, for example, atmospheric to 50 lbs. per square inch gage. However, somewhat higher pressures, e. g., 100 to 200 lbs. per square inch may be used.

As a typical example of the results obtained by this catalyst, a six-hour run was made in which 35° A. P. I. midcontinent gas oil was vaporized and vapors passed over the catalyst at a temperature of 925° F. The space velocity was 1.02 gallons of oil per gallon of catalyst per hour. In this operation, there was obtained 14.75% of gasoline and 1.78% of uncondensible gas. The gasoline end point (A. S. T. M. distillation) was 406° F. The knock rating was 76 C. F. R. M. and the Reid vapor pressure, 9.1 lb.

An attempt to prepare an active cracking catalyst by co-precipitating the cadmium compound with the silica during the preparation of the silica gel failed as shown by the data in the following table. In this experiment cadmium nitrate was dissolved in the dilute sulfuric acid solution before adding the sodium silicate and the gel was then washed and dried as previously described. This catalyst contained about 1% of cadmium. For comparison, the table also shows results obtained with silica gel which was untreated.

*Catalytic conversion of gas oil to gasoline—424° end point single pass. Temperature—925°*

|  | Silica gel untreated | Silica gel treated with cadmium | Silica gel co-precipitated cadmium |
| --- | --- | --- | --- |
| Space velocity | 1.7 | 1.26 | 1.33 |
| Volume percent gasoline | 9.5 | 18.7 | 5.8 |
| Pounds of gas per gallon of gasoline | 1.31 | 1.15 | 1.27 |
| Octane number C. F. R. M. (calculated from 20% blends with 65 C. F. R. M) | 72.6 | 83.5 | 71.6 |

It will be observed from these data that the catalyst made by combining the cadmium and the silica at the time of forming the gel was even less effective than the untreated silica gel with respect to both gasoline yield and gasoline knock rating. Also, the ratio of uncondensible gas to gasoline was higher with both untreated silica gel and the co-precipitated gel catalyst than it was when using our new catalyst.

The explanation of the enhanced effectiveness of catalyst is not easily determined. We believe, however, that when the silica gel is treated with the cadmium salt solution, there occurs a simultaneous adsorption and hydrolysis causing the deposition of a cadmium compound on the surface of the silica throughout its entire pore structure. This compound is probably an oxygen compound of cadmium such as cadmium hydroxide or more probably the cadmium unites to form a complex compound with the $SiO_2$ molecules and hydrated $SiO_2$ molecules on the surface of the gel and within the pores of the grains thereof. It is believed that the molecules of $SiO_2$ at the surface present unsatisfied valences which form a chemical union with the cadmium and its compounds so that the gel treated with cadmium salt solution is substantially identical in physical structure with the untreated silica gel excepting that the entire surface, including the immense interior pore surface, is coated with not more than a monomolecular layer of cadmium compound. Furthermore, we believe that the electronic structure of the cadmium compound on the surface is disturbed by the unbalanced electronic structure of the $SiO_2$, previously referred to as unsatisfied valence, and that in some way the peculiarly high activity of these catalysts is related to their unbalanced electronic structure, or to the molecular orientation of the cadmium compound.

As evidence of the hydrolysis of the cadmium salt on the surface of the gel, we find that the solution develops a definite acidity which can only be accounted for by the following hydrolytic reaction:

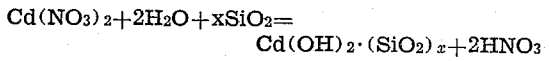

$$Cd(NO_3)_2 + 2H_2O + xSiO_2 = Cd(OH)_2 \cdot (SiO_2)_x + 2HNO_3$$

We choose to call this reaction an "adsorbolytic" reaction, indicating that the hydrolysis or splitting of the cadmium salt is brought about by the adsorption phenomenon. Simultaneously, with the formation of acid in the solution, there is deposited within the silica a measurable amount of cadmium compound which we have shown by analysis to vary between about 0.1 to 2% of cadmium, depending partly on the concentration of cadmium salt solution employed, the hydrogen ion concentration in the solution, and the method of treatment. One typical analysis indicated the presence of 0.29% of cadmium in the catalyst.

Although we prefer to use a cadmium salt solution of about 0.1 molar concentration, this may be varied over a considerable range without greatly affecting the amount of cadmium deposited within the gel. Thus, we may use concentrations from about 0.02 M. to 1.5 M., if desired. We may increase the amount of cadmium hydrolyzed by various methods. For example, we may add a buffer salt to the solution, such as cadmium acetate for the purpose of regulating the pH value of the solution, care being taken to avoid pH values which might result in the precipitation of insoluble cadmium compounds by double decomposition. We may also repeat the treatment of the gel with cadmium solution of the same or different concentrations, or we may perform the treatment in a flowing stream. The cadmium salt solution may be made to flow through a series of beds of the gel in rotation so that the most nearly spent solution serves to contact the fresh gel, thus adsorbing the greater amount of the cadmium from the solution.

In the previous description of preparing the catalyst, the freshly prepared gel was dried after washing and before treating with the cadmium solution. However, it is sometimes desirable to omit this drying step. The freshly made gel which has been thoroughly washed may be immediately treated with the cadmium solution and then dried. In this case, however, a longer time is required for diffusion of the solution into the larger pieces of the jelly or precipitate.

As indicated above, the catalyst may be regenerated after it has become fouled with carbonaceous deposits in the cracking operation. Regeneration is most conveniently accomplished by passing a stream of air and inert gas, for example, steam, through the catalyst bed, care being taken to control the oxygen concentration of the regenerating gas so that the combustion temperature is kept below about 1200° F. and preferably below about 1100° F. Excessive heating above these temperatures causes catalyst deterioration. After regeneration, the cracking may be continued. The duration of cracking between regeneration periods may be about 5 hours but this depends largely on the nature of the stock being cracked. If the stock cracked is a residual oil containing asphaltic matter, the duration of cracking is considerably less before catalyst activity is seriously reduced. Thus, with a typical Mid-Continent residual oil of about 22° A. P. I. gravity, the catalyst may be used for a period of about 30 minutes to 2 hours between regenerations. When using gas oil, we have found that in a typical operation the catalyst activity has decreased about 25% to 50% in a period of 6 hours. In the case of residual oils or very heavy distillate charging stocks, we may initially crack the oil in one catalyst bed and produce intermediate boiling hydrocarbons with very little gasoline. Then we may pass the vapors directly into a second catalyst bed with or without heating to a higher temperature to complete the cracking. The extent or depth of cracking per pass depends partly on the freshness of the catalyst and on the temperature. If desired, the process may be conducted to produce from gas oil about 45% to 55% of gasoline in a single pass and the uncracked products heavier than gasoline may be either recycled in the operation or cracked in a secondary cracking operation. Alternatively, the extent of cracking may be maintained about 20 to 30% and the uncracked heavy products may be recycled until completely cracked, the only products being gasoline and gas. Carbonaceous matter produced in the operation, deposits on the catalyst and is removed in regeneration.

If desired, we may employ the catalyst in a moving bed apparatus in which a portion of the spent catalyst is continuously withdrawn and regenerated externally, fresh and/or regenerated catalyst being supplied continuously to the apparatus. We may also employ the catalyst in finely divided form. For example, the catalyst may be finely divided by grinding and supplied as a slurry in oil to the cracking chamber or coil or introduced as a powder into the vapor stream. In this type of operation, the spent catalyst is settled or filtered from the products and separately regenerated.

Although we have given specific examples of methods of preparing the catalyst and have described its use in certain cracking operations, we intend that our invention be limited only by the following claims.

We claim:

1. The process of converting heavy hydrocarbon oils into gasoline, comprising subjecting the vapors of said oils at a temperature between about 700 and 1050° F. to the action of a cadmium-promoted catalyst consisting essentially of silica gel treated with a cadmium compound in an acid solution and thereafter washed and dried.

2. The process of converting heavy hydrocarbon oils into gasoline of high knock rating which comprises subjecting the vapors of said oils at a temperature between about 700 and 1050° F. to the action of a catalyst consisting essentially of cadmium activated silica gel, substantially free of water-soluble cadmium salts, wherein the surface of said silica gel is coated with a less than monomolecular layer of a cadmium oxygen compound deposited thereon by adsorption from an acid solution of a cadmium salt.

3. The process of converting a heavy hydrocarbon oil into gasoline of high knock rating which comprises subjecting the vapors of said oil at a high conversion temperature to the action of a solid contact catalyst consisting essentially of silica gel promoted with a small amount of cadmium oxide.

RALPH M. MELAVEN.
RODNEY V. SHANKLAND.